(12) United States Patent
Kawai et al.

(10) Patent No.: US 6,743,891 B2
(45) Date of Patent: Jun. 1, 2004

(54) METHOD FOR PRODUCING ETHYLENE-VINYL ALCOHOL COPOLYMER RESIN COMPOSITION

(75) Inventors: Hiroshi Kawai, Kurashiki (JP); Masao Hikasa, Kurashiki (JP); Takaharu Kawahara, Okayama (JP); Toshio Tuboi, Okayama (JP)

(73) Assignee: Kuraray Co., Ltd., Kurashiki (JP)

(*) Notice: Subject to any disclaimer, the term of this patent is extended or adjusted under 35 U.S.C. 154(b) by 0 days.

(21) Appl. No.: 10/050,962

(22) Filed: Jan. 22, 2002

(65) Prior Publication Data

US 2002/0135098 A1 Sep. 26, 2002

(30) Foreign Application Priority Data

Jan. 22, 2001 (JP) ........................................ 2001-012804

(51) Int. Cl.$^7$ .................................................. C08F 6/00
(52) U.S. Cl. ....................... 528/494; 264/176.1; 524/69; 528/494
(58) Field of Search ........................... 264/176.1; 524/69

(56) References Cited

U.S. PATENT DOCUMENTS

| 2,835,659 A | 9/1958 | Guillet et al. |
|---|---|---|
| 3,087,922 A | 4/1963 | Whittington et al. |
| 3,585,177 A | 6/1971 | Gardener et al. |
| 4,366,296 A | 12/1982 | Kitagawa et al. |
| 4,547,329 A | 10/1985 | Dombroski et al. |
| 4,824,701 A | 4/1989 | Grosbard |
| 5,322,866 A | 6/1994 | Mayer et al. |
| 5,384,187 A | 1/1995 | Uemura et al. |

FOREIGN PATENT DOCUMENTS

| DE | 30 21 273 | 1/1981 |
|---|---|---|
| DE | 40 30 399 | 4/1992 |
| EP | 0 193 110 | 9/1986 |
| EP | 0 408 503 | 1/1991 |
| EP | 0 560 369 | 9/1993 |
| EP | 0 892 006 | 1/1999 |
| EP | 0 930 339 | 7/1999 |
| EP | 1 072 616 | 1/2001 |
| EP | 1 085 028 | 3/2001 |
| JP | 49-134763 | 12/1974 |
| JP | 50-44281 | 4/1975 |
| JP | 62-248617 | 10/1987 |
| JP | 5-9334 | 1/1993 |
| JP | 5-39392 | 2/1993 |
| JP | 10-158412 | 6/1998 |
| JP | 2000-43038 | 2/2000 |
| JP | 2000-102918 | 4/2000 |
| JP | 2000-191874 | 7/2000 |
| JP | 2000-294972 | 9/2000 |
| JP | 2001-354779 | 12/2001 |
| WO | WO 97/38025 | 10/1997 |

Primary Examiner—Terressa Boykin
(74) Attorney, Agent, or Firm—Oblon, Spivak, McClelland, Maier & Neustadt, P.C.

(57) ABSTRACT

The present invention provides a method for producing an ethylene-vinyl alcohol copolymer resin composition, said method comprising: a) introducing into an extruder an ethylene-vinyl alcohol copolymer resin having a water content of at least 0.5 weight % and an additional component; b) kneading the resin and the additional component whereby to form an ethylene-vinyl alcohol copolymer resin composition; and c) discharging said resin composition from the extruder; wherein said method further comprises feeding water in a liquid state to the extruder and/or removing water in a liquid state from the extruder. Thereby, strand-breakage or cutting errors are suppressed and thus, molded products such as pellets can be provided with a stable shape.

23 Claims, 1 Drawing Sheet

METHOD FOR PRODUCING ETHYLENE-VINYL ALCOHOL COPOLYMER RESIN COMPOSITION

BACKGROUND OF THE INVENTION

1. Field of the Invention

The present invention relates to a method for producing an ethylene-vinyl alcohol copolymer (hereinafter abbreviated as "EVOH") resin composition.

2. Description of the Related Art

EVOH has a high gas barrier property and excellent oil resistance, aroma retention property, transparency, and the like. Due to these properties, EVOH is formed into films, sheets, bottles etc. and widely used for food packaging and the like.

Conventionally, various properties of EVOH have been improved by blending it with various other components. It has also been proposed that the EVOH and various components be melt-kneaded in an extruder. Although typically EVOH in a dry state is introduced into an extruder, JP05 (1993)-9334A discloses a method of using water-containing EVOH. In JP05 (1993)-9334A, EVOH pellets having a water content ranging from 20 wt % to 60 wt % and raw starch (corn starch with a water content of 12 wt %) are introduced into a Henschel mixer and mixed. The mixture is fed to a twin-screw extruder with a vent-port to be kneaded at a temperature of 120° C., and melt-extruded in a strand form. The strand-like coagulate is pelletized by means of a pelletizer. However, when such a mixture containing the above-mentioned amount of water is melt-kneaded using a twin-screw extruder having no dewatering portion, free water is readily generated and as a result, the strands break immediately after being discharged from the extruder. This breakage makes it difficult to provide pellets having a stable shape. When the pellet shape is unstable, several problems may occur, for example, powder may be generated during transportation of the pellets thus causing thermal deterioration, or the powder may block in a hopper when the pellets are fed into a molding machine, resulting in surging.

SUMMARY OF THE INVENTION

The method of producing an EVOH resin composition according to the present invention comprises: introducing an EVOH resin having a water content of at least 0.5 wt %, preferably 0.5 wt % to 70 wt % (componentA) and an additional component (component B) into an extruder; kneading the components A and B while adjusting the water content of the resin composition in the extruder by feeding water to and/or removing water from the extruder; and discharging the resulting EVOH resin composition. Here, water is fed and removed as a liquid. Unless otherwise stated, the term 'water' is used here to indicate liquid water and not water in non-liquid state such as water vapor.

The present invention provides an EVOH resin composition having a stable shape since the water content is adjusted before the composition is discharged by feeding water to and/or removing water from the extruder so as to suppress strand-breakage or the like.

DETAILED DESCRIPTION OF THE INVENTION

Figure 1:
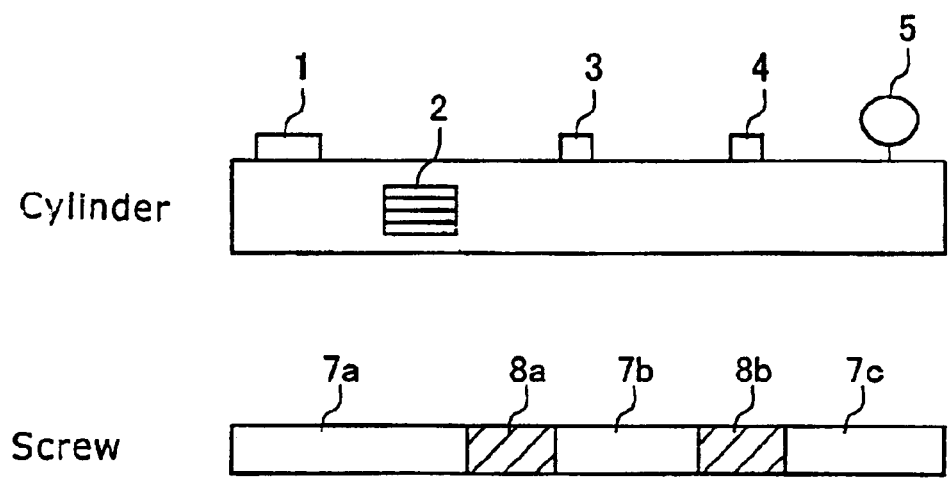
FIG. 1 shows a side view of a cylinder and a screw of a twin-screw extruder that can be used in one embodiment of the present invention.

Preferred embodiments of the invention will now be described with reference to accompanying FIG. 1.

The preferred water content of the resin composition immediately after discharge from the extruder is in the range from 5 wt % to 40 wt %. When the water content is extremely high, phase separation may occur between the resin and the water contained in the resin, and strands of the EVOH resin composition tend to foam immediately after being discharged from the extruder. When the water content is extremely low, the resin viscosity increases and this may result in thermal deterioration due to shear heat, or may cause the extruder to overload and fail. Moreover, the strands may not melt completely and may break easily. If the resin composition immediately discharge from the extruder has a water content of less than 5 wt %, the EVOH needs to be heated to a high temperature for successful melt-kneading in the extruder. The EVOH will thus deteriorate due to the heat.

To adjust the water content in the above-noted range, any of the following methods can be applied.

1) feeding water to the extruder;
2) removing water from the extruder; and
3) a combination of feeding of water to the extruder and removal of water from the extruder.

As discussed below, the water to be fed into the extruder may include water as a solvent for various additives or water added as a washing solution (or any water contained in such a washing solution). Water to be removed can contain saponification catalyst residue which is also removed by washing. There is no specific limitation on how often the water is fed or removed and the order in which these steps are carried out.

The water in the extruder includes water present in the EVOH. Since water-containing EVOH is introduced into the extruder in the method of the present invention, the EVOH can be melt-kneaded at a low temperature. This serves to suppress thermal deterioration of the EVOH and also thermal deterioration or decomposition of any additional materials. The temperature of the melted resin in the extruder is preferably from 70° C. to 170° C. For efficiently adjusting the water in an extruder while maintaining the extruder at a relatively low temperature, it is preferable that water (liquid water but not water vapor) is fed or removed. The method of the present invention is especially suitable for obtaining pellets with a stable shape by controlling the water content in the extruder while melt-kneading at a low temperature so as to suppress thermal deterioration of the EVOH resin composition.

The method of removing liquid water is especially suitable when the EVOH resin composition is to be washed in the extruder or when an additive is introduced as an aqueous solution into the extruder. Without this step the amount of water in the extruder may become excessive.

There is no specific limitation on the components to be blended with EVOH. Herein the EVOH is denoted as "component A" while the component to be added is denoted as "component B". Examples of component B include various resins and also plastic additives such as plasticizers, antioxidants, lubricants, ultraviolet absorbers, antistatic agents, flame retardants and crystalline nucleating agents. Antioxidants are preferred additives. Preferred antioxidants include inorganic compounds such as hydrotalcite-based compounds, organic compounds such as hindered phenols, hindered amines, and phosphorus-based antioxidants.

Inorganic substances can also be used as component B. Such inorganic substances include, for example, glass-based filers such as glass fibers, glass flakes, and glass beads; metal salts such as calcium carbonate, calcium titanate, and barium sulphate; metal oxides such as alumina, titanium oxide, silicon dioxide, zinc oxide, and zeolite; wollastnite; carbon fiber; and inorganic layered compounds. An inorganic layered compound is configured by forming sheets of atoms bonded firmly by covalent bonding or the like and densely aligned. The sheets are laminated substantially in parallel by e.g., van der Waals forces or electrostatic forces. Examples include talc, micas, kaolinite, montmorillonite, and vermiculite. The inorganic layered compounds can be natural products or synthetic products. The component B can also be any other additive such as the carboxylic acids described below as representative examples of component C. An alternative and suitable method is blending the additives as a master batch that is previously blended with a resin composition other than the component A.

Resins are particularly suitable for the component B. It is particularly preferable that the resins be compatible with EVOH, have functional groups to react with EVOH, or can disperse in EVOH finely.

Examples of resins compatible with EVOH include 6-nylon, polyurethanes, polyvinyl alcohols, ethylene-vinyl acetate copolymers and partially saponified derivatives thereof, and starch. Alternatively, component B may be an EVOH having composition or molecular weight to that of component A.

Examples of resins having functional groups which are able to react with EVOH include polyolefins modified with a carboxylic acid derivative such as maleic anhydride, melt-mixtures of ionomers and polyamides, and boronic acid modified resins.

An example of a resin that may disperse in EVOH finely is polymer fine particles having a core-shell structure.

Boronic acid modified resins are particularly suitable for use in the method of the invention. Since a boronic acid modified resin is thickened by a reaction with EVOH hydroxyl groups, control of viscosity of the resin composition will be especially important. In a conventional method of melt-kneading dry resins, thickened spots are easily generated when a relatively large amount of boronic acid modified resin is blended with the EVOH. This may result in failures such as strand-breakage and cutting errors. Such failures can be suppressed by melt-kneading water-containing EVOH and a boronic acid modified resin and by adjusting water content of the resin composition in accordance with the invention.

In this description, a boronic acid modified resin is a resin having at least one functional group selected from a boronic acid group and a boron-containing group that can be converted to a boronic acid group in the presence of water (hereinafter referred to as a 'boron-containing group'). Namely, the resin comprises at least one functional group selected from a boronic acid group and a boron-containing group, in which the group is bonded to the main chain, side chain or to a terminal position via a boron-carbon bond.

Carbons of the boron-carbon bond may be derived from a base polymer of resins mentioned below or from a boron compound to be reacted with the base polymer. Preferred examples of the boron-carbon bond are bonds between boron and alkylene groups on the main chain, at a terminal position or on a side chain.

A boronic acid group may be expressed by the formula (1) below.

[Formula 1]

There is no specific limitation on the boron-containing group as long as the group can be converted to a boronic acid group expressed by the above formula (1) as a result of hydrolysis in the presence of water. Representative examples thereof include boronic ester groups expressed by the formula (2) below, boronic acid anhydride groups expressed by the following formula (3), and boronic acid salt groups expressed by the following formula (4).

[Formula 2]

[Formula 3]

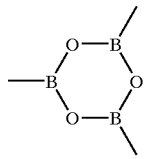

[Formula 4]

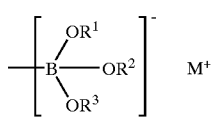

In the formulae, X and Y denote hydrogen atoms, aliphatic hydrocarbon groups (e.g., linear or branched alkyl groups or alkenyl groups having 1–20 carbon atoms), alicyclic hydrocarbon groups (e.g., cycloalkyl groups and cycloalkenyl groups), or aromatic hydrocarbon groups (e.g., phenyl groups and biphenyl groups). X and Y can be the same group or can be different from each other. X and Y can also be bonded to each other. At least one of X and Y denotes a group other than a hydrogen atom (the same group as in the formula (1)). Similar to the X and Y groups, $R^1$, $R^2$ and $R^3$ each independently denotes a hydrogen atom, an aliphatic hydrocarbon group, an alicyclic hydrocarbon group or an aromatic hydrocarbon group. M denotes either an alkali metal or an alkaline earth metal. The above-identified X, Y, $R^1$, $R^2$ and $R^3$ can also comprise other groups such as carboxyl groups and halogen atoms.

Specific examples of the boronic ester group shown in the formula (2) include a boronic dimethyl ester group, a boronic diethyl ester group, a boronic dipropyl ester group, a boronic diisopropyl ester group, a boronic dibutyl ester group, a boronic dihexyl ester group, a boronic dicyclohexyl group, a boronic ethylene glycol ester group, a boronic propylene glycol ester group (boronic 1,2-propanediol ester group; or boronic 1,3-propanediol ester group), a boronic trimethylene glycol ester group, a boronic neopentyl glycol ester group, a boronic catechol ester group, a boronic glyceroester group, and a boronic trimethylolethane ester group. More specifically, a boron-containing group denotes a group that can be converted to a boronic acid group when the resin is hydrolyzed in water or in a liquid comprising water and an organic solvent (such as toluene, xylene, and acetone) under conditions in which the hydrolysis reaction time ranges from 10 minutes to two hours at a reaction temperature of from 25° C. to 150° C.

Though the functional group content particularly limited, a preferred range is from 0.0001 meq/g to 1 meq/g (milliequivalent/g), more preferably from 0.001 meq/g to 0.1 meq/g.

Monomers which constitute the base polymer of the above boron-containing resin include, for example, olefin-based monomers such as α-olefins like ethylene, propylene, 1-butene, isobutene, 3-methylpentene, 1-hexene, and 1-octene; styrenes such as styrene, a-methylstyrene, 2-methylstyrene, 3-methylstyrene, 4-methylstyrene, 4propylstyrene, 4-t-butylstyrene, 4cyclohexylstyrene, 4-dodecylstyrene, 2-ethyl-4-benzilstyrene, 4-(phenylbutyl) styrene, 2,4,6-trimethylstyrene, monofluorostyrene, difluorostyrene, monochlorostyrene, dichorostyrene, methoxystyrene, and t-butoxystyrene; vinyl group-containing aromatic compounds such as vinylnaphthalenes such as 1-vinylnaphthalene and 2-vinylnaphthalene; vinyl aromatic compounds such as vinylene group-containing aromatic compounds such as indene and acenaphthylene; and conjugated diene compounds such as butadiene, isoprene, 2,3-dimethylbutadiene, pentadiene, and hexadiene.

Base polymers may be polymers comprising one, two, three or more kinds of these monomers. Particularly preferred among these base polymers are copolymers of a vinyl aromatic compound and a conjugated diene compound and ethylene-based polymers (e.g., very low density polyethylene, low density polyethylene, medium density polyethylene, high density polyethylene, linear low density polyethylene, ethylene-vinyl acetate copolymer, ethylene-acrylic ester copolymer, a metal salt of an ethylene-acrylic ester copolymer (an ionomer based on Na, K, or Zn), or an ethylene-propylene copolymer).

The following description is of a representative method for producing a resin having at least one functional group selected from a boronic acid group and a boron-containing group. A resin having this functional group can be obtained by reacting a resin having a carbon-carbon double bond with a borane complex and trialkylester of boric acid under a nitrogen atmosphere so as to provide a resin having a boronic dialkylester group, and further reacting the resin with either water or an alcohol. By using a resin having a double bond at the terminal position in this method, the −15 obtained resin has either a boronic acid group or a boron-containing group at the terminal position. A resin having a double bond on a side chain or in the main chain can provide a resin having either a boronic acid group or a boron-containing group on a side chain or on the main chain respectively.

Representative methods for producing resins having double bonds in the material include 1) ordinary olefin-based polymers having a trace quantity of double bonds at the terminal positions; 2) thermally decomposing an ordinary olefin-based polymer under oxygen-free conditions so as to obtain an olefin-based polymer having a double bond at the terminal position; 3) copolymerizing an olefin-based monomer and a diene-based monomer; and 4) copolymerizing a vinyl aromatic compound and a conjugated diene-based monomer.

Any known methods for producing olefin-based polymers can be used for method 1). A particularly preferred method uses a metallocene-based polymerization catalyst without using hydrogen as a chain transfer agent (see e.g., DE 4030399). The resin of 2) can be obtained by thermally decomposing an olefin-based polymer at a temperature ranging from 300° C. to 500° C. under oxygen-free conditions such as a nitrogen atmosphere or a vacuum by any known methods (see e.g., U.S. Pat. No. 2,835,659 and U.S. Pat. No. 3,087,922). Regarding 3), a method for producing an olefin-diene-based polymer using a known Ziegler catalyst (see e.g., JP50 (1975)-44281 A and DE 3021273) can be used.

From the olefin-based polymer having a double bond obtained by method 1) or 2) described above, polyolefins having at least one functional group selected from a boronic acid group and a boron-containing group which is bonded to the terminal position can be obtained. A resin having the above-mentioned functional group bonded to the side chain is obtained from an olefin-based polymer having a double bond obtained by method 3) or from a copolymer comprising a vinyl aromatic compound and a conjugated diene compound obtained by method 4).

Preferred borane complexes include a borane-tetrahydrofuran complex, a borane-dimethyl sulfide complex, a borane-pyridine complex, a borane-trimethylamine complex, and a borane-triethylamine complex. A borane-triethylamine complex and a borane-trimethylamine complex are particularly preferred. Preferred ratios of the charge on the borane complex to the double bonds of a base polymer are in the range from ⅓ to 10 equivalents. Preferred boric trialkyl esters are selected from boric lower alkyl esters such as trimethyl borate, triethyl borate, tripropyl borate, and tributyl borate. Preferred ratios of the charge on the boric trialkyl ester to the double bonds of the olefin-based polymer are in the range from 1 to 100 equivalents. Though a solvent is not necessarily used, it is preferable to use a saturated hydrocarbon-based solvent such as hexane, heptane, octane, decane, cyclohexane, ethylcyclohexane, and decalin.

The boron introducing reaction may be performed at a reaction temperature ranging from 25° C. to 300° C., preferably from 100° C. to 250° C., and a reaction time ranging from 1 minute to 10 hours, or preferably from 5 minutes to 5 hours. Regarding conditions for reacting with water or alcohols, typically, an organic solvent such as toluene, xylene, acetone, or ethyl acetate is used for the reaction solvent. A substantial excess of water or alcohol is used, typically ranging from 1 to 100 equivalents to the boronic acid groups. The reaction is performed at a temperature of from 25° C. to 150° C. for a time from 1 minute to almost a day. The alcohol can be selected, for example, from methanol, ethanol and butanol, or a polyhydric alcohol such as ethylene glycol, 1,2-propanediol, 1,3-propanediol, neopentyl glycol, glycerol, trimethylolethane, pentaerythritol, and dipentaerythritol.

Among the boronic acid modified resins, resins comprising polyolefins as base polymers are preferred for blending with EVOH (component A), and polyethylene is further preferred for the base polymer. Use of a resin having at least one functional group selected from a boronic acid group and a boron-containing group at the terminal position is preferred for obtaining excellent impact resistance while suppressing generation of gels and hard spots when the boronic acid modified resin is blended with the EVOH.

Another example of a preferred resin for use in the method of the present invention is polyurethane. When polyurethane is blended in a conventional manner, i.e., by melt-kneading with dry EVOH, thickened spots are generated inside an extruder, which will result in failures such as strand-breakage and cutting errors. As a result, polyurethane cannot be melt-kneaded in an extruder by conventional methods. These failures can be suppressed by melt-kneading water-containing EVOH and polyurethane and appropriately adjusting the water content in accordance with the method of the invention.

For those resins with only a small difference between the thermal decomposition temperature and the melting point, such as EVOH containing a lower proportion of ethylene, polyvinyl alcohol and starch, thermal decomposition in the extruder is likely while the resin is being melt-kneaded with dry EVOH. This causes problems like foaming and coloring and results in difficulty in obtaining a stable extrusion. Such resins should preferably be melt-kneaded in accordance with the method of the present invention since their melting points are lowered in the presence of water, and they can thus be melt-kneaded at relatively low temperatures.

The component B is not limited to the exemplified resins, but it can also be an ethylene-vinyl acetate copolymer, a partially-saponified resin of an ethylene-vinyl acetate copolymer resin, polyethylene, amorphous nylon, 6–12 nylon, a styrene-butadiene block copolymer, a styrene-isoprene block copolymer and the like, which are incompatible with EVOH but may be blended with the EVOH in order to provide flexibility to the EVOH.

For component B, it is preferable that either the melting point or the flow-starting temperature or both are not higher than 170° C. Such a component is melted at the temperature in the extruder and shows favorable dispersibility with respect to the water-containing EVOH. When both the melting point and the flow-starting temperature exceed 170° C., the component will not melt in the extruder. This will hinder obtaining a uniform dispersion, and can induce molding failure or a defective appearance.

Here, the flow-starting temperature denotes the temperature at which the fluidity of a sample passes from the solid region to the fluid region, through a rubber-elastic region, as judged by continuous fluidity measurements using a flow tester (a fixed loading extrusion capillary rheometer) while raising the temperature over time.

Suitable amounts of component B for blending with respect to 100 weight parts of EVOH range from 0.01 weight parts to 200 weight parts. When component B is a resin, a preferred range is from 1 weight part to 200 weight parts, and more preferably, from 5 weight parts to 100 weight parts. When the amount of the resin is less than 1 weight parts, sufficient resin blending effects may not be obtained in many cases. Specifically, flexibility may not be improved in the case of a boronic acid modified resin, while sufficient solubility may not be obtained in the case of a polyvinyl alcohol or starch modified resin. On the other hand, when the amount of resin exceeds 200 weight parts, the gas barrier property may be insufficient. In the case where component B is an antioxidant, preferred amounts for blending range from 0.01 weight parts to 5 weight parts. When the amount is less than 0.01 weight parts, antioxidant effects may be difficult to detect, while an amount over 5 weight parts may cause bleed-out of the antioxidant from a molded product or a deterioration in the smooth feeding of the resin to the extruder.

Melting and kneading of EVOH in the interior of an extruder is further described below by referring to FIG. 1. FIG. 1 shows the cylinder of a twin-screw extruder and a screw to be arranged inside thereof in one embodiment of the present invention. In this embodiment, water-containing EVOH (component A) and component B are fed from a raw material feeding portion 1 of a twin-screw extruder.

In a step of introducing the components A and B into the extruder, the two components can be dry-blended before they are introduced into a hopper of the extruder. Alternatively, the components A and B can be introduced into the hopper simultaneously, or they can be introduced separately using two feeders. The method of feeding components A and B separately from two feeders is most preferred since the components can be fed quantitatively and quality variation can be reduced. The shapes of the respective components to be introduced into the hopper are not limited specifically as long as they are pellets, powders (including a crumb shape) or the like.

The EVOH resin composition containing water is heated in the extruder and melted or semi-melted before it is fed forward (to the right side in FIG. 1) by a full-flight screw 7a. Excess water is squeezed out at a dewatering portion 2. Then, the EVOH composition is mixed at an inverse flight screw 8a before it is fed to a full-flight screw 7b. Water vapor is discharged from the vent-port 3 so that the water content of the resin is further adjusted while the pressure inside the extruder is also adjusted.

Subsequently, the EVOH resin composition is fed to an inverse flight screw 8b where the composition is melt-kneaded, if required, with a component C (for example, at least one component selected from a carboxylic acid, a boron compound, a phosphoric acid compound, an alkali metal salt, and an alkaline earth metal salt) fed from a minor component feeding portion 4. Even after the dewatering step, the EVOH to be kneaded with the additive still contains water. The temperature of the EVOH is controlled based on values measured at a temperature sensor 5 positioned at the end of a final full-flight screw 7c.

The EVOH can be obtained by saponifying an ethylene-vinyl ester copolymer. A suitable content of ethylene is generally from 3 mol % to 70 mol %. From the viewpoint of providing molded products having a high gas barrier property and excellent melt moldability, the content of ethylene is preferably from 10 mol % to 60 mol %, more preferably from 20 mol % to 55 mol %, and most preferably from 25 mol % to 55 mol %. Furthermore, the saponification degree of the vinyl ester component is preferably from 80 mol % to 100 mol %. From the viewpoint of providing EVOH having a high gas barrier property, the saponification degree is preferably 95 mol % or more, and particularly preferably 99 mol % or more.

EVOH having an ethylene content ranging from 3 mol % to 20 mol % is suitable provided it is sufficiently water soluble. Such an aqueous solution of EVOH has an excellent gas barrier property, film formation property, and is excellent for use as a coating material. EVOH having a saponification degree ranging from 80 mol % to 95 mol % is suitable for improving the melt moldability. It may be possible to use such EVOH alone. Such EVOH may also be used by blending it with EVOH having a saponification degree of 99 mol % or more.

Both EVOH containing ethylene in the range from 3 mol % to 20 mol % and EVOH having a saponification degree ranging from 80 mol % to 95 mol % are difficult to form pellets of a stable shape when a methanol solution of the EVOH is simply extruded as strands in coagulation baths. However, when using the process of the present invention, the EVOH can be processed into pellets of a stable shape, and resins to be blended with the EVOH can be added uniformly.

With an ethylene content of the EVOH is less than 3 mol %, the resulting EVOH has poor melt moldability, and may have reduced hot-water resistance, thermal resistance, and gas barrier properties under high humidity. On the other hand, with an ethylene content of more than 70 mol %, the resultant EVOH may not provide a satisfactory gas barrier property, printability, or the like. Furthermore, with a saponification degree of less than 80 mol %, the resultant EVOH may not have satisfactory gas barrier properties, coloring resistance, and humidity resistance.

The EVOH to be introduced into the extruder should have a water content of at least 0.5 wt %. The preferred water content is at least 5 wt %, or more preferably, 7 wt %, since EVOH containing water in the above range can be melted at a temperature lower than the melting point of dry EVOH. In this manner, thermal deterioration of the EVOH in the extruder can be suppressed. Preferably, the EVOH to be introduced into the extruder should have a water content of not more than 70 wt %. A preferred water content is not more than 60 wt %, or more preferably, not more than 50 wt %. When the water content is more than 70 wt %, phase separation between the resin and water contained in the resin may occur in the EVOH resin composition. If such a phase separation occurs, the surface of the resin becomes wet, thus increasing the friction. As a result, bridges may form in the hopper of the extruder, which may adversely affect the productivity of the pellets of the EVOH resin composition.

There is no specific Imitation on the method for adjusting the water content of the EVOH before introducing the EVOH into the extruder. To increase the water content, methods such as spraying water onto the resin, immersing the resin in water, bringing the resin into contact with water vapor, and the like, may be employed. Furthermore, to reduce the water content, appropriate drying methods may be employed. Methods of drying the resin include, for example, the use of a fluidized hot-air dryer or a ventilation hot-air dryer. From the viewpoint of reducing the unevenness of drying, a fluidized hot-air dryer is preferred. Furthermore, from the viewpoint of inhibiting thermal deterioration, the drying temperature is preferably 120° C. or less.

EVOH is preferably formed as pellets by cutting strands precipitated in a coagulation bath. However, there is no specific limitation on the EVOH shapes. Crumb-shaped precipitation obtained by coagulating an EVOH paste to provide an indeterminate form can also be used. Alternatively, an EVOH paste can be introduced directly into the extruder.

According to the present invention, it is possible to wash and remove the residue of the saponification catalyst contained in EVOH inside the extruder. Specifically, a washing solution may be injected into at least one portion of the extruder so as to wash the EVOH, and the washing solution may be discharged from at least one portion downstream from the washing solution-injecting portion. This method is preferable because washing is performed effectively and a large washing space is not required as compared with the conventional method in which EVOH pellets are placed in a washing container and are brought into contact with a washing solution in a solid state to extract the residue of the saponification catalyst by diffusion from the interior of the pellets.

The saponification catalyst residue contained in the EVOH fed to the extruder is typically alkali metal ions. The above-mentioned washing in the interior of the extruder can be particularly effective when the content of the alkali metal ions is in the range from 0.1 wt % to 5 wt % in terms of metal. There is no great difference from a conventional washing process when the content is less than 0.1 wt %. When the content exceeds 5 wt %, sufficient washing requires an extruder with a large screw length (L)/screw diameter (D), and this will raise the cost. The alkali metal ion content should preferably be at least 0.2 wt %, or more preferably, at least 0.5 wt %. The content is preferably not more than 4 wt %, more preferably, not more than 3 wt %.

The alkali metal ions contained in the washed EVOH is not more than 0.05 wt % in terms of metal, and preferably, not more than 0.04 wt %, or most preferably, not more than 0.03 wt %. When alkali metal ions remain at more than 0.05 wt %, the thermal stability of the EVOH may deteriorate.

There is no specific limitation on the washing solution as long as it can remove a residue of the saponification catalyst. For example, water can be used. An aqueous solution of an acid having a pKa of at least 3.5 at 25° C. is suitable. When a solution of an acid having a pKa of less than 3.5 is used, the resulting EVOH has insufficient coloring resistance and interlayer adhesion. Carboxylic acids, or particularly acetic acid or propionic acid are preferred as the acid with a pKa of at least 3.5. Preferred carboxylic acid concentrations in aqueous solution are in the range from 0.01 g/liter to 10 g/liter, especially from 0.1 g/liter to 2 g/liter. The preferred amount of the washing solution for injection is from about 0.1 liters to about 100 liters per 1 kg of EVOH.

There is no specific limitation on the method of injection of the washing solution, as long as injection into an extruder can be performed. For example, injection can be carried out using a plunger pump. There is no specific limitation on the method of discharge of the washing solution, as long as the solution can be discharged from the extruder downstream of the injection point. For example, a dewatering slit or a dewatering hole can be used. In this manner, the water content of the resin is adjusted at the time of discharge of the washing solution. Alternatively, plural injection portions and plural discharge portions can be provided.

Since a dewatering slit or a dewatering hole can discharge a liquid or a gas, it can remove moisture efficiently from a resin with a high water content. On the other hand, a typical vent-port (e.g., a vacuum vent for removing water vapor under reduced pressure, and an open vent for removing water vapor under atmospheric pressure) can discharge water vapor only. Moreover, the resin tends to adhere to the vent-port and such adhered resin deteriorates and enters the extruder. Furthermore, when the dewatering hole is used, molded resin may leak from the hole. For this reason, a dewatering slit is preferred. Preferred examples of such a dewatering slit include a wedge wire dewatering slit and a screen mesh type dewatering slit.

The above-mentioned dewatering means may be used singly or a plurality of the same type of dewatering means may be used, or a combination of different types of dewatering means may be used. For example, it is possible to remove an amount of water from resin having a high water content with a dewatering slit and then further remove water by a vent-port located downstream from the dewatering slit.

Subsequent to the respective steps of washing, dewatering and/or degassing, the resin is blended in the extruder with an additive selected from a carboxylic acid, a boron compound, a phosphoric acid compound, an alkali metal salt and an alkaline earth metal salt. The additives can be used singly, or more preferably in combinations selected in order to improve the respective properties of the EVOH.

Thermal stability can be improved by adding a carboxylic acid to the EVOH. The carboxylic acid can be selected from, for example, oxalic acid, succinic acid, benzoic acid, citric acid, acetic acid, propionic acid and lactic acid. When some factors such as cost are taken into consideration, acetic acid, propionic acid or lactic acid is preferred.

The preferred content of carboxylic acid with respect to the dry EVOH resin composition is in the range from 10 ppm to 5000 ppm. When the carboxylic acid content is less than 10 ppm, insufficient coloring resistance during melt-molding may be obtained. When the content exceeds 5000 ppm, insufficient interlayer adhesion may be obtained. A preferred lower limit for the carboxylic acid content is 30 ppm, more preferably, 50 ppm. A preferred upper limit for the carboxylic acid content is 1000 ppm, more preferably, 500 ppm.

The thermal stability of the EVOH can be improved by adding a phosphoric acid compound to the EVOH. The content of phosphoric acid compound with respect to the dry EVOH resin composition is preferably from 1 ppm to 1000 ppm in terms of phosphate radical. Coloring of the molded product, and the generation of gels and hard spots can be suppressed by a suitable amount of a phosphoric acid compound. The above-mentioned effects due to addition of the phosphoric acid compound will be apparent especially for a long-run molding of EVOH resin composition pellets and recycling the molded products. Examples of the phosphoric acid compound are acids such as phosphoric acid and phosphorous acid and their salts, though they are not limitative. The phosphate can be present in any form of primary phosphate, secondary phosphate, and/or tertiary phosphate. Though there is no specific limitation, the cationic species is preferably an alkali metal salt or an alkaline earth metal salt. It is especially preferable that the phosphoric acid compound to be added is selected from sodium dihydrogenphosphate, potassium dihydrogenphosphate, disodium hydrogenphosphate, and dipotassium hydrogenphosphate.

The lower limit of the content of phosphoric acid compound in the dry EVOH resin composition is preferably 10 ppm, and more preferably 30 ppm in terms of phosphate radical. The upper limit is preferably 500 ppm, and most preferably 300 ppm. By adding a phosphoric acid compound in the above range, the obtained EVOH resin composition will be more resistant to coloring and gelation. When the content of phosphoric acid compound is less than 1 ppm, insufficient suppression of coloration may be obtained at the time of melt molding. In particular, this phenomenon is observed to a greater extent when thermal treatment is performed several times. A product obtained by molding the resin composition pellets may have poor recycling properties. Furthermore, when the content of phosphoric acid compound is more than 1000 ppm, more gels and hard spots are likely to form.

The thermal stability and mechanical properties of EVOH can be improved by adding a boron compound. The reason for this is thought to be that a chelate is formed between the EVOH and the boron compound. The boron compound can be selected, for example, from boric acids, esters of boric acids, borates, and boron hydrides. Examples of the boric acids are orthoboric acid, metaboric acid, and tetraboric acid. Examples of the esters of boric acids are triethyl borate and trimethyl borate. Examples of the borates are borax and alkali metal salts and alkaline earth metal salts of the above-identified boric acids. Among these compounds, orthoboric acid (hereinafter referred to as 'boric acid') is preferred.

The content of the boron compound in the pellets of the dried EVOH resin composition is preferably in the range from 10 ppm to 2000 ppm, and more preferably from 50 ppm to 1000 ppm in terms of boron. When the content is less than 10 ppm, insufficient improvement in the thermal stability may be obtained. When the content is more than 2000 ppm, gelation easily occurs, which may lead to the formation of defects.

By adding an alkali metal salt, the interlayer adhesion and compatibility of the EVOH can be improved. It is preferable that the content of alkali metal salt in the EVOH is from 5 ppm to 5000 ppm, more preferably from 20 ppm to 1000 ppm, still more preferably from 30 ppm to 750 ppm in terms of the alkali metal element. As the alkali metal, lithium, sodium, potassium or the like may be used. As the alkali metal salt, aliphatic carboxylic acid salts, aromatic carboxylic acid salts, phosphoric acid salts, metal complexes or the like with an univalent metal may be used. For example, sodium acetate, potassium acetate, sodium propionate, potassium propionate, sodium phosphate, lithium phosphate, sodium stearate, potassium stearate, sodium salts of ethylenediaminetetraacetic acid and the like may be employed. Among these, sodium acetate, potassium acetate, sodium propionate, potassium propionate and sodium phosphate are preferred.

When an alkaline earth metal salt is added, the improvement in coloring resistance is slightly reduced, however, the extent of adhesion of the heat-degraded resin to a die of a molding machine at the time of melt-molding using the resin composition can be further reduced. The alkaline earth metal salt is not particularly limited, and for example, magnesium salts, calcium salts, barium salts, beryllium salts and the like may be used. Particularly, magnesium salts and calcium salts are suitable. The anionic species of the alkaline earth metal salt is also not limited particularly, but acetate anions, propionate anions and phosphate anions are particularly suitable.

It is preferable that the alkaline earth metal content in the EVOH is from 10 ppm to 1000 ppm, more preferably from 20 ppm to 500 ppm in terms of metal. When the content of alkaline earth metal is less than 10 ppm, the improvement in long-run property may be insufficient. When the content of alkaline earth metal exceeds 1000 ppm, coloring at the time of resin melting may be more intense.

The above-mentioned additives such as carboxylic acids can be kneaded uniformly if these additives are blended in an extruder. EVOH resin composition pellets having excellent extrusion stability, coloring resistance and long-run property can be obtained with fewer gels and hard spots and less adhesion to the die when using less motor torque and less torque change of the extruder during a melt-molding. These effects can be obtained by feeding the additives to the extruder at a point where the EVOH contains water and is in a melted state. The additives can be blended more uniformly by feeding the additives to the extruder at a kneading portion.

There is no specific limitation on the method of adding the above-identified additives such as carboxylic acids. Examples of such methods are adding the additive as a dry powder in the interior of the extruder, adding the additive as a paste impregnated with a solvent, adding the additive in a state suspended in a liquid, and adding a solution of the additive dissolved in a solvent. Particularly preferred from the viewpoint of dispersing the additive homogeneously in the EVOH is a method comprising adding a solution of the additive in a solvent. Though there is no specific limitation on the nature of the solvent, water (or an aqueous solution) is preferably used because water has a good solubility with respect to at least one of the above-mentioned additives, and advantages in terms of cost, ease of handling, safety in operation, etc. The additive can be provided from one portion of the extruder or it can be provided from two or more portions. As in the case of the washing solution, there is no specific limitation on the method of injecting the solution.

When an additive such as a carboxylic acid is added to the EVOH in the from of a solution, the lower limit of the added amount of the solution is preferably 1 weight part, more preferably 3 weight parts, and particularly 5 weight parts, with respect to 100 weight parts of dry EVOH. Furthermore, the upper limit of the added amount of the solution is preferably 50 weight parts, more preferably 30 weight parts, and particularly 20 weight parts, with respect to 100 weight parts of dry EVOH. When the added amount of the solution is less than 1 weight part, the improvement in dispersibility of the additive may be reduced, since the concentration of the solution must generally be increased. Furthermore, when the added amount is more than 50 weight parts, it may be difficult to control the water content of EVOH, and thus phase separation between the resin and the water contained in the resin may occur in the extruder.

In a conventionally known method of immersing EVOH in a treatment solution, it is difficult to obtain high quality crumb-shaped EVOH precipitation products or the like. By blending in an extruder, EVOH of that form can be provided homogeneously with additives such as a carboxylic acid, and thus, EVOH resin composition pellets with consistent quality can be obtained.

As mentioned above, the resin temperature in the extruder is preferably from 70° C. to 170° C. If the resin temperature is lower than 70° C., EVOH may not melt completely. It is preferable that various additives such as carboxylic acids are blended with the EVOH in a melted state so as to provide further improvement in dispersibility. The resin temperature is preferably at least 80° C., or more preferably, at least 90° C. When the resin temperature exceeds 170° C., the EVOH may be susceptible to thermal deterioration. From such viewpoints, the resin temperature is preferably not more than 150° C., or more preferably, not more than 130° C. Though there is no specific limitation on the adjustment of the resin temperature, it is preferred that the temperature of a cylinder in the extruder is set in a proper manner.

The resin temperature can be determined by using a measured value of a temperature sensor applied to the extruder cylinder. Preferably, the temperature sensor is applied in the vicinity of a discharge port at a tip of the extruder.

The water content of the EVOH resin composition immediately after being discharged from the extruder is typically from 5 wt % to 40 wt %, particularly preferably, 5 wt % to 35 wt %. When the water content of the EVOH resin composition immediately after being discharged from the extruder exceeds 40 wt %, phase separation between the resin and the water contained in the resin may occur easily. The phase separation may induce foaming of the strands immediately after being discharged from the extruder. When the water content of the discharged EVOH resin composition is less than 5 wt %, heat-deterioration of the EVOH due to heat in the extruder may be observed, and thus, the EVOH pellets may not have sufficient coloring resistance. The water content can be adjusted by controlling the amount of water to be fed to the extruder (including water contained in washing solutions etc.) or water discharged from the extruder.

There is no specific limitation on a method of pelletizing the EVOH resin composition discharged from the extruder. For example, the resin composition can be extruded as strands from a die into a coagulation bath before being cut into predetermined lengths. For facilitating handling of the pellets, such a die may have a bore diameter ranging from 2 mm$\phi$ to 5 mm$\phi$ (hereinafter, $\phi$ denotes a diameter), and the strands can be cut to be about 1 mm to about 5 mm in length.

Usually, the thus obtained pellets are further subjected to drying. The water content in the EVOH resin composition pellets after drying is generally not more than 1 wt %, preferably not more than 0.5 wt %. The method for drying is not particularly limited, however, ventilation drying, fluidized drying and the like are suitable. A multi-step drying process combining several drying methods may also be employed. Among these, a drying method comprising fluidized drying, followed by ventilation drying is preferred.

When EVOH resin composition pellets are treated by simply immersing in a treatment solution, generally the water content of the treated EVOH reaches a range from about 40 wt % to about 70 wt %. In the present invention, the water content of the EVOH resin composition immediately after being discharged from the extruder can be adjusted easily by melting the EVOH in the extruder and adding any required additives to the same extruder. The water content of the EVOH resin composition is preferably in the range from 5 wt % to 40 wt %. Moreover, use of such pellets containing less water can reduce energy consumption during any drying step.

Pellets with a water content over 40 wt % may adhere to each other at a drying temperature of 100° C. or more. Blending additives in an extruder is advantageous to prevent this adhesion.

A blend of at least two types of EVOH differing in polymerization degree, ethylene content, saponification degree and the like may be melt molded. Furthermore, various plasticizers, stabilizers, surfactants, coloring materials, ultraviolet absorbers, antistatic agents, desiccants, crosslinking agents, metal salts, fillers, reinforcing materials such as various types of fibers, etc. may be added to the EVOH.

A thermoplastic resin other than EVOH may be mixed with the EVOH in a proper amount not to hinder the purposes of the present invention. Examples of the thermoplastic resin include polyolefins (polyethylene, polypropylene, poly-1-butene, poly-4-methyl-1-pentene, ethylene-propylene copolymers, copolymers of ethylene and an $\alpha$-olefin having at least 4 carbon atoms, copolymers of a polyolefin and maleic anhydride, ethylene-vinyl ester copolymers, ethylene-acrylic acid ester copolymers, modified polyolefins in which these polyolefins are grafted with an unsaturated carboxylic acid or its derivative, etc.), various types of nylons (nylon-6, nylon-6,6, nylon-6/nylon-6,6 copolymers, etc.), polyvinyl chloride, polyvinylidene chloride, polyester, polystyrene, polyacrylonitrile, polyurethane, polyacetal, modified polyvinyl alcohol resin, and the like.

The thus obtained EVOH resin composition pellets may be melt-molded into various forms such as films, sheets, containers, pipes, fibers and the like by melt molding. These molded products can be crushed and re-molded for reuse. The films, sheets, and fibers can be stretched uniaxially or biaxially. Melt molding may be effected by extrusion molding, inflation, blow molding, melt spinning, injection molding and the like. The preferred temperature for melting is from about 150° C. to about 270° C., though it can be selected appropriately depending on melting point etc. of the copolymer.

The above-mentioned EVOH resin composition pellets can be molded as a film or sheet to be laminated with other layer(s) to provide a multilayered structure for use. Though there is no specific limitation on the multilayered structure, examples include E/Ad/T and T/Ad/E/Ad/T where E denotes an EVOH resin composition, Ad denotes an adhesive resin and T denotes a thermoplastic resin. Each of the layers can comprise a single layer or a multilayer.

The multilayered structure can be molded without any further treatment, or it can be stretched to improve its physical properties. A stretched multilayered structure can be a stretched film, a stretched sheet or the like having substantially no problems such as rupture, pin holes, uneven stretch and delamination. Uniaxial stretching or biaxial stretching methods may be employed. From the viewpoint of obtaining good physical properties, stretching to the highest possible stretching ratio is preferred. Examples of useful stretching methods include high draw ratio stretching such as deep-drawing formation, vacuum formation, etc., in addition to roll stretching methods, tenter stretching methods, tubular stretching methods, stretching blow methods, and the like. As the biaxial stretching, a simultaneous biaxial stretching method or a sequential stretching method may be employed. The stretching temperature is selected, for example, from 80° C. to 170° C., and preferably from 100° C. to 160° C.

Thus, the stretching is completed, followed by thermal fixation. The thermal fixation can be carried out by well-known means. For example, the thermal fixation is carried out at a temperature ranging from 80° C. to 170° C. and preferably from 100° C. to 160° C. for a time ranging from 2 seconds to 600 seconds with the stretched film under tension. Furthermore, the resultant stretched film may be subjected to a cooling treatment, a printing treatment, a dry laminating treatment, a solution coating or melt coating treatment, a bag-making process, a box process, a tube process, split process, and the like.

EXAMPLES

The present invention will be illustrated further in detail with reference to the following non-limiting examples. Ion exchange water was used in all cases. Methods for evaluating the properties are as follows.

(1) Measurement of Water Content

A sample of water-containing EVOH (20 g) was put in a well-dried weighing bottle, and dried at 120° C. for 24 hours in a hot air drying oven. From the change in the weight of the EVOH before and after drying, the water content of the EVOH was calculated using the following equation:

Water content (wt %)={(weight before drying−weight after drying)/weight before drying}×100

(2) Determination of the Added Minor Components

Determination was carried out according to the methods mentioned below. The term 'dry chip' in the following description describes a product obtained by adding in an extruder at least one component selected from a carboxylic acid, a boron compound, a phosphoric acid compound, an alkali metal salt and an alkaline earth metal salt to an EVOH resin composition in an extruder, drying the composition pellets at 100° C. for 15 hours by means of a fluidized hot-air dryer, and subsequently drying at 100° C. for 15 hours by means of a ventilation hot-air dryer.

(2-a) Determination of Acetic Acid Content

A sample of dry chips (20 g) was introduced into 100 ml of water and heat-extracted for 6 hours at 95° C. The extract was subjected to acid-base titration with 1/50 N NaOH with phenolphthalein as indicator, so as to determine the acetic acid content.

(2-b) Determination of $Na^+$, $K^+$, and $Mg^{2+}$ ions

A sample of dry chips (10 g) was introduced into 50 ml of 0.01N aqueous hydrochloric acid, and stirred at 95° C. for 6 hours. The stirred aqueous solution was subjected to quantitative analysis by ion chromatography. For a column, ICS-C25 manufactured by YOKOGAWA ELECTRIC CORP. was used. For eluant, an aqueous solution of 5.0 mM tartaric acid and 1.0 mM 2,6-pyridinedicarboxylic acid was used. In the determination, a calibration curve made with respect to an aqueous solution of sodium chloride, an aqueous solution of potassium chloride and an aqueous solution of magnesium chloride was used. Thus, the amount of alkali metal salts and the amount of alkaline earth metal salts in the dry chips was determined in terms of metal, based on the amount of $Na^+$, $K^+$, $Mg^{2+}$ ions.

(2-c) Determination of Boron Compound $Na_2CO_3$ aqueous solution was added to the sample chips and subjected to incineration in a platinum crucible at 600° C. Hydrochloric acid was added to dissolve the resulting sample. Then, the content of boron compound in the resulting sample was determined in terms of boron by an ICP emission spectral analysis.

(2-d) Determination of Phosphoric Acid Ion

A sample of dry chips (10 g) was introduced into 50 ml of 0.01N aqueous hydrochloric acid and stirred at 95° C. for 6 hours. The stirred aqueous solution was subjected to quantitative analysis by ion chromatography. For a column, ICS-A23 manufactured by YOKOGAWA ELECTRIC CORP. was used. For eluant, an aqueous solution containing 2.5 mM sodium carbonate and 1.0 mM sodium hydrogen carbonate was employed. In the determination, a calibration curve made with respect to an aqueous solution of phosphoric acid was used. Thus, the amount of phosphoric acid compound was determined in terms of phosphate radical based on the amount of the resultant phosphoric acid ions.

(3) Method for Measuring Flow-Starting Temperature

The fluidity of the samples was measured continuously using a flow tester (a fixed loading extrusion capillary rheometer) whilst raising the temperature over time. The flow-starting temperature was calculated in the following manner using the corresponding analysis software.

| | |
|---|---|
| Apparatus | Shimadzu flow tester CFT-500D/100D (manufactured by Shimadzu Corporation) |
| Type | Fixed loading extrusion |
| Testing method | Temperature-rising |
| Initial temperature | 100° C. |
| Temperature-rise speed | 5° C./minute |
| Die | 1 mmφ × 10 mm |
| Measured load | 100 kg |
| Measurement position | 0 mm to 15 mm |
| Analysis software | CFT-500D type/100D PC software |
| Operation | A sample (2 g) was introduced into a cylinder. After introduction, the sample was preheated for 6 minutes before starting measurement. Strokes (piston position) were measured for every 3° C. increasing so as to draw a temperature-piston extrusion stroke curve. |
| Calculation of flow-starting temperature (1/2 method) | The flow-starting temperature was found by obtaining 1/2 of the difference between the flow-finishing point (Smax) and the minimum point (Smin) in the temperature-piston extrusion stroke curve (flow curve) (X = (Smax − Smin)/2), and by adding this half difference (X) and the Smin. |

The melting point was measured according to the Japanese Industrial Standard (JIS) K7122.

(4) Melt Index (MI)

Measurement was carried out according to ASTM-D1238, by using a melt indexer at a temperature of 190° C. and a load of 2160 g.

Example 1

A sample of polyurethane pellets ('KURAMIRON® U1780' manufactured by Kuraray Co., Ltd.) was prepared as component B and an EVOH having an ethylene content of 44 mol %, a saponification degree of 99.5 mol %, a melt index of 5 g/10 minutes under a dry condition, and a water content of 50 wt % was used as component A. Components A and B were introduced from a raw material feeding portion 1 of a twin-screw extruder having a structure illustrated in FIG. 1, while excess water and excess water vapor were discharged via dewatering portion (dewatering slit) 2 and vent-port 3 respectively. An aqueous solution containing acetic acid/potassium dihydrogenphosphate/sodium acetate/magnesium acetate was added via minor component adding portion 4.

The amount of EVOH pellets introduced was set to be 10 kg/hour (including the weight of water contained in the pellets), while the amount of polyurethane introduced was set to be 2 kg/hour and the amount of treatment solution for adding the minor components was set to be 0.25L/hour. Concentrations of the respective minor components in the treatment solution were: 5 g/L for acetic acid, 2.8 g/L for potassium dihydrogenphosphate, 9.2 g/L for sodium acetate, and 6 g/L for magnesium acetate.

The following are the specifications of the twin-screw extruder (the structure is illustrated in FIG. 1).

| Type | Twin-screw extruder |
|---|---|
| L/D | 45.5 |
| Bore diameter | 30 mmφ |
| Screw | Complete meshing in the support-adjusting member direction |
| Rotation number | 300 rpm |
| Motor capacity | DC22KW |
| Heater | 13-parts split type |
| Number of die holes | 5 holes (hole diameter: 3 mmφ) |
| Temperature of resin in dies | 140° C. |
| Speed of extracting resin | 5 m/min |

Strands discharged from the die were cooled in a water tank and pelletized using a fan cutter ('FC-108S-1' manufactured by Hoshi Plastic CO., LTD). Substantially, no problems due to strand-breakage or cutting errors were encountered, and the obtained pellets had a stable shape. The water content of the resin composition pellets after discharge from the extruder was 15 wt %.

The resulting resin composition pellets were dried for 25 hours at 100° C. in a fluidized dryer, and subsequently dried for 15 hours at 100° C. in a ventilation dryer. Analysis of the dried EVOH resin composition pellets showed that the water content was 0.1 wt %, the content of acetic acid was 200 ppm, the content of phosphoric acid compound was 60 ppm in terms of phosphate radical, the content of alkali metal salt was 20 ppm in terms of potassium, and 80 ppm in terms of sodium, and the content of alkaline earth metal salt was 30 ppm in terms of magnesium.

Tables 1–4 show the above-described results.

Example 2

EVOH resin composition pellets were obtained in a manner similar to that of Example 1. As component B, the EVOH copolymer 'EXCEVAL® RS4105' manufactured by Kuraray Co., Ltd. was used. The ethylene content of component B was 9 mol %, the saponification degree was 98 mol %, and the water content was 5 wt %. As with Example 1, the stability of the strands and the pellet shape were good. Details of the extrusion conditions, components of the treatment solution, analytical results for the pellets etc. are shown in Tables 1–4.

Example 3

EVOH resin composition pellets were obtained in a manner similar to that of Example 1. EVOH having an ethylene content of 52 mol %, a saponification degree of 95 mol %, a melt index of 6 g/10 minutes, and a water content of 0.3 wt % was used as component B. As with Example 1, the stability of the strands and the pellet shape were good. Details of the extrusion conditions, components of the treatment solution, analytical results for the pellets etc. are shown in Tables 1–4.

Example 4

EVOH resin composition pellets were obtained in a manner similar to that of Example 1. The EVOH used as component B was a composition having water content of 0.3 wt %, and comprising 100 weight parts of 'EVAL® F101' (ethylene content 32 mol %) manufactured by Kuraray Co., Ltd. and 1 weight part of 'IRGANOX® 1098' (manufactured by Ciba Speciality Chemicals) as an antioxidant. As with Example 1, the stability of the strands and the pellet shape were good. Details of the extrusion conditions, components of the treatment solution, analytical results for the pellets etc. are shown in Tables 1–4.

Example 5

EVOH resin composition pellets were obtained in a manner similar to that of Example 1, using a low density polyethylene (LDPE) as component B. The low density polyethylene was 'NOVATEC'® LJ900N manufactured by Japan Polychem Corporation. As with Example 1, the stability of the strands and the pellet shape were good. Details of the extrusion conditions, components of the treatment solution, analytical results for the pellets etc. are shown in Tables 1–4.

Examples 6–8

EVOH resin composition pellets were obtained in a manner similar to that of Example 1, using a boronic acid group-containing thermoplastic resin as component B.

A method for producing a thermoplastic resin containing a boronic acid group is as follows. First, a very low density polyethylene (VLDPE, 'EXCELEN®' EUL430 manufactured by SUMITOMO CHEMICAL) was fed to a twin-screw extruder at a speed of 13 kg/hour while the input port was supplied with nitrogen of 1 L/min. Next, a liquid comprising a mixture of borane-triethylamine complex and boric acid 1,3-butanediol ester (borane-triethylamine complex (TEAB)/boric acid 1,3-butanediol ester(BBD)=29/71 by weight) was fed in via liquid feeder 1 at a speed of 0.6 kg/hour while 1,3-butanediol was fed via liquid feeder 2 at a speed of 0.5 kg/hour, and continuously kneaded. During the kneading, the applied pressure was adjusted so that the gauges of the vents 1 and 2 indicated about 20 mmHg. As a result, a very low density polyethylene (BR-VLDPE) containing boronic acid 1,3-butanediol ester groups was obtained from the discharge port at a speed of 13 kg/hour.

This BR-VLDPE had 47 μmol/g of functional groups, no detectable double bonds, and a melt index (MI) of 4 g/10 min. (190° C., 2160 g).

Details of the twin-screw extruder used for the reaction and of the operating conditions are as follows.
One-directional twin-screw extruder TEM-35B manufactured by TOSHIBA MACHINE:

| Screw diameter | 37 mmφ |
|---|---|
| L/D | 52 (15 blocks) |
| Liquid feeders | C3 (liquid feeder 1), C11 (liquid feeder 2) |
| Vent positions | C6, C14 |
| Screw structure | Seal rings are applied to parts between C5 and C6, between C10 and C11, and to C12. |
| Temperature setting | C1: water cooling |
| | C2–C3: 200° C. |
| | C4–C15: 250° C. |
| | Die: 250° C. |
| Screw rotation rate | 400 rpm |

Strand stability and the shape of the obtained pellets were also good when using BR-VLDPE. Details of the extrusion conditions, components of the treatment solution, analytical results for the pellets etc. are shown in Tables 1–4.

Comparative Example 1

A 45 wt % methanol solution of ethylene-vinyl acetate copolymer with an ethylene content of 44 mol % was placed in a saponification reactor. A sodium hydroxide/methanol solution (80 g/L) was added thereto so as to be 0.4 equivalents with respect to the vinyl acetate component in the copolymer, and methanol was added thereto so that the concentration of the copolymer was adjusted to 20 wt %. The temperature was raised to 60° C. and reaction was performed for about 4 hours while blowing nitrogen gas into the reactor. After 4 hours, the reacted product was neutralized with acetic acid to stop the reaction. In this manner, a methanol solution of EVOH with an ethylene content of 44 mol % and a saponification degree of 99.5 mol % was obtained.

The EVOH solution was extruded through circular holes in a metal plate into water, thereby allowing the EVOH solution to precipitate in the form of strands. The strands were cut into pellets having a diameter of about 3 mm and a length of about 5 mm. A large amount of water was added to the dewatered pellets and the pellets were then dewatered in a centrifugal separator sand the washing method repeated.

3.5 kg of the thus obtained EVOH pellets (water content: 55 wt %) were immersed for 6 hours at room temperature in 6L of an aqueous solution containing 0.4 g/L of acetic acid, 0.1 g/L of potassium dihydrogen phosphate, 0.4 g/L of sodium acetate, and 0.3 g/L of magnesium acetate. After immersion, liquid was removed from the pellets, and the obtained pellets with a water content of 55 wt % were dried at 80° C. for 15 hours with a fluidized dryer and then dried at 100° C. for 24 hours using a ventilation dryer. Thus, dry pellets (water content: 0.3 wt %) were obtained. The obtained EVOH pellets had a content of acetic acid of 300 ppm, and a content of phosphoric acid compound of 100 ppm in terms of phosphate radical. The content of alkali metal salts was 40 ppm in terms of potassium and 130 ppm in terms of sodium. The content of alkaline earth metal salts was 50 ppm in terms of magnesium. Furthermore, the melt index was 5 g/10 min.

The above-described EVOH pellets (including water contained in the pellets) and the polyurethane used in Example 1 were introduced at a rate of 10 kg/hour and 4 kg/hour respectively into an extruder having a structure similar to that in FIG. 1 via a raw material feeding portion. As a result, strand-breakage occurred frequently, and a sample with a stable shape could not be obtained. Since considerable cutting errors were found in the shapes of the obtained pellets, the pellets were not good. The water content of the pellets was 0.1 wt %. Details of the extrusion conditions, components of the treatment solution, analytical results for the pellets etc. are shown in Tables 1–4.

Comparative Example 2

EVOH resin composition pellets were obtained in a similar manner to Comparative Example 1 using the boronic acid group-containing thermoplastic resin BR-VLDPE produced as in Example 6. However, strand-breakage occurred frequently, and a sample with a stable shape could not be obtained. Since considerable cutting errors were found in the shapes of the obtained pellets, the pellets were not good. Details of the extrusion conditions, components of the treatment solution, analytical results for the pellets etc. are shown in Tables 1–4.

Comparative Example 3

A 45 wt % methanol solution of ethylene-vinyl acetate copolymer having an ethylene content of 44 mol % was placed in a saponification reactor, a sodium hydroxide/methanol solution (80 g/L) was added thereto so as to be 0.4 equivalent with respect to a vinyl acetate component in the copolymer, and methanol was added thereto so that the concentration of the copolymer was adjusted to 20 wt %. The temperature was raised to 60° C. and reaction was performed for about 4 hours while blowing nitrogen gas into the reactor. After 4 hours, the reacted product was neutralized with acetic acid to stop the reaction. In this manner, a methanol solution of EVOH with an ethylene content of 44 mol % and a saponification degree of 99.5 mol % was obtained.

The EVOH solution was extruded through circular holes in a metal plate into water, thereby allowing the EVOH solution to precipitate in the form of strands. The strands were cut into pellets having a diameter of about 3 mm and a length of about 5 mm. A large amount of water was added to the dewatered pellets and the pellets were then dewatered in a centrifugal separator and the washing method repeated.

3.5 kg of the thus obtained EVOH pellets (water content: 55 wt %) were immersed for 6 hours at room temperature in 6L of an aqueous solution containing 0.4 g/L of acetic acid, 0.1 g/L of potassium dihydrogenphosphate, 0.4 g/L of sodium acetate, and 0.3 g/L of magnesium acetate. After immersion, the liquid was removed from the pellets, and pellets of EVOH resin composition (water content: 55 wt %) were obtained.

The thus obtained EVOH pellets were introduced into an extruder similar to that shown in FIG. 1, and the EVOH was blended with a boronic acid modified resin in a manner similar to that in Example 7 except that the dewatering portion, the vent-port and the minor component adding portion were sealed in order not to carry out dewatering, degassing, or addition of minor components. The discharged strand was foamed, and a sample having a stable shape could not be obtained. Details of the extrusion conditions, components of the treatment solution, analytical results for the pellets etc. are shown in Tables 1–4.

TABLE 1

| | | Extrusion condition | | | | Water content (%) | |
| | | | | Aqueous solution | | | |
| | Component B | Amount (kg/hr) | Blend content (weight part) | of minor component (L/hr) | Resin temp. (° C.) | Before introduction | Immediately after discharging |
|---|---|---|---|---|---|---|---|
| Example 1 | Polyurethane (133) | 2 | 40 | 0.25 | 140 | 50 | 15 |
| Example 2 | EVOH (130) | 0.25 | 5 | 0.25 | 130 | 50 | 19 |
| Example 3 | EVOH (140) | 1 | 20 | 0.25 | 130 | 50 | 17 |
| Example 4 | EVOH (165) | 5.0 | 100 | 0.25 | 130 | 50 | 17 |

TABLE 1-continued

Extrusion condition

| | | | | Aqueous solution of minor | | Water content (%) | |
| | Component B | Amount (kg/hr) | Blend content (weight part) | component (L/hr) | Resin temp. (° C.) | Before introduction | Immediately after discharging |
|---|---|---|---|---|---|---|---|
| Example 5 | LDPE (106) | 1 | 20 | 0.25 | 130 | 50 | 17 |
| Example 6 | BR-VLDPE (90) | 0.5 | 10 | 0.25 | 130 | 50 | 19 |
| Example 7 | BR-VLDPE (90) | 1 | 20 | 0.25 | 130 | 50 | 17 |
| Example 8 | BR-VLDPE (90) | 1.5 | 30 | 0.25 | 140 | 50 | 16 |
| Com. Ex. 1 | Polyurethane (133) | 4 | 40 | — | 250 | 0.3 | 0.1 |
| Com. Ex. 2 | BR-VLDPE (90) | 3 | 30 | — | 250 | 0.3 | 0.1 |
| Com. Ex. 3 | BR-VLDPE (90) | 0.9 | 20 | 0.25 | 130 | 55 | 52 |

\* Numerical values referring to the resins denote either flow-starting temperature (polyurethane) or melting points (the remainders) (° C.).
\* Blend content denotes the amount of a blended component with respect to EVOH of 100 weight parts.
\* Charge of all the EVOH (ethylene content: 44 mol %; saponification degree: 99.5 mol %) is 10 kg/hr including volatile parts of the EVOH.
\* Com. Ex. = Comparative Example

TABLE 2

Components of treatment solutions

| | Acetic acid (g/L) | Boric acid (g/L) | Phosphoric acid compound (g/L) | Alkali metal salt (g/L) | Alkaline earth metal salt (g/L) |
|---|---|---|---|---|---|
| Example 1 | 5 | — | 2.8 | 9.2 | 6.0 |
| Example 2 | 2 | 30 | 0.6 | — | — |
| Example 3 | 5 | — | 2.8 | 9.2 | 6.0 |
| Example 4 | 5 | — | 2.8 | 9.2 | 6.0 |
| Example 5 | 5 | — | 2.8 | 9.2 | 6.0 |
| Example 6 | 5 | — | 2.8 | 9.2 | 6.0 |
| Example 7 | 5 | — | 2.8 | 9.2 | 6.0 |
| Example 8 | 5 | — | 2.8 | 9.2 | 6.0 |
| Com. Ex. 1 | 0.4 | — | 0.1 | 0.4 | 0.3 |
| Com. Ex. 2 | 0.4 | — | 0.1 | 0.4 | 0.3 |
| Com. Ex. 3 | 0.4 | — | 0.1 | 0.4 | 0.3 |

\* Phosphoric acid compound is $KH_2PO_4$
\* Alkali metal salt is NaOAc
\* Alkaline earth metal salt is $Mg(OAc)_2$

TABLE 3

Resin compositions

| | Acetic acid (ppm) | Boric acid (ppm) | Phosphoric add compound (ppm) | Alkali metal salt (ppm) | Alkaline earth metal salt (ppm) |
|---|---|---|---|---|---|
| Example 1 | 200 | — | 60 | K: 20 Na: 80 | Mg: 30 |
| Example 2 | 100 | 270 | 20 | K: 6 | — |
| Example 3 | 190 | — | 60 | K: 20 Na: 80 | Mg: 30 |
| Example 4 | 120 | — | 40 | K: 15 Na: 50 | Mg: 20 |
| Example 5 | 240 | — | 80 | K: 30 Na: 100 | Mg: 40 |
| Example 6 | 270 | — | 90 | K: 40 Na: 120 | Mg: 50 |
| Example 7 | 240 | — | 80 | K: 30 Na: 100 | Mg: 40 |
| Example 8 | 210 | — | 70 | K: 30 Na: 90 | Mg: 40 |
| Com. Ex. 1 | 300 | — | 100 | K: 40 Na: 130 | Mg: 50 |
| Com. Ex. 2 | 300 | — | 100 | K: 40 Na: 130 | Mg: 50 |
| Com. Ex. 3 | 240 | — | 80 | K: 30 Na: 100 | Mg: 40 |

\* Boric acid concentration is indicated in terms of boron.
\* Phosphoric acid compound concentration is indicated in terms of phosphate radical.
\* Alkali metal salt concentration is indicated in terms of alkali metal.
\* Alkaline earth metal salt concentration is indicated in terms of alkaline earth metal.

TABLE 4

| | Extrusion stability | |
| --- | --- | --- |
| | Strand stability | Pellet shape |
| Example 1 | Good | Good |
| Example 2 | Good | Good |
| Example 3 | Good | Good |
| Example 4 | Good | Good |
| Example 5 | Good | Good |
| Example 6 | Good | Good |
| Example 7 | Good | Good |
| Example 8 | Good | Good |
| Com. Ex. 1 | Frequent strand-breakage | Defective due to cutting error |
| Com. Ex. 2 | Frequent strand-breakage | Defective due to cutting error |
| Com. Ex. 3 | Frequent strand-breakage | Defective due to cutting error |

As mentioned above, the present invention provides an EVOH resin composition in which various components other than EVOH are kneaded, and the EVOH resin composition can be molded to provide pellets or the like with a stable shape. The addition of various additives also further improves the properties of the EVOH resin composition.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A method for producing an ethylene-vinyl alcohol copolymer resin composition, said method comprising:
    a) introducing into an extruder an ethylene-vinyl alcohol copolymer resin having a water content of at least 0.5 weight % and an additional component;
    b) kneading the resin and the additional component to form an ethylene-vinyl alcohol copolymer resin composition; and
    c) discharging said resin composition from the extruder; wherein during step b) said method further comprises feeding water in a liquid state to the extruder and/or removing water in a liquid state from the extruder.

2. The method according to claim 1, wherein said ethylene-vinyl alcohol copolymer resin has a water content ranging from 0.5 weight % to 70 weight %.

3. The method according to claim 1, wherein the resin composition immediately after discharge from the extruder has a water content ranging from 5 weight % to 40 weight %.

4. The method according to claim 1, wherein the temperature of the resin composition when melted in the extruder is in the range from 70° C. to 170° C.

5. The method according to claim 1, wherein the amount of the additional component ranges from 0.01 weight parts to 200 weight parts per 100 weight parts of the ethylene-vinyl alcohol copolymer resin.

6. The method according to claim 1, wherein the additional component comprises a resin.

7. The method according to claim 6, wherein the melting point and/or the flow-starting point of the resin is no higher than 170° C.

8. The method according to claim 6, wherein the resin composition melted in the extruder is further blended with an additive selected from a carboxylic acid, a boron compound, a phosphoric acid compound, an alkali metal salt, an alkaline earth metal salt, and mixtures thereof.

9. The method according to claim 8, wherein the additive is added as an aqueous solution.

10. A method for producing ethylene-vinyl alcohol copolymer resin composition pellets, wherein an ethylene-vinyl alcohol copolymer resin obtained according to a method as claimed in claim 1 is cut to form pellets and subsequently dried until the water content is reduced to 1 weight % or lower.

11. An ethylene-vinyl alcohol copolymer resin composition produced by the method as claimed in claim 1.

12. The method according to claim 6, wherein the amount of the additional component ranges from 5 weight parts to 100 weight parts per 100 weight parts of the ethylene-vinyl alcohol copolymer resin.

13. In a method of manufacturing an article with an ethylene-vinyl alcohol copolymer resin, the improvement comprising producing the ethylene-vinyl alcohol copolymer resin according to the method of claim 1.

14. In a method of manufacturing an article with an ethylene-vinyl alcohol copolymer resin, the improvement comprising producing the ethylene-vinyl alcohol copolymer resin according to the method of claim 2.

15. In a method of manufacturing an article with an ethylene-vinyl alcohol copolymer resin, the improvement comprising producing the ethylene-vinyl alcohol copolymer resin according to the method of claim 3.

16. In a method of manufacturing an article with an ethylene-vinyl alcohol copolymer resin, the improvement comprising producing the ethylene-vinyl alcohol copolymer resin according to the method of claim 4.

17. In a method of manufacturing an article with an ethylene-vinyl alcohol copolymer resin, the improvement comprising producing the ethylene-vinyl alcohol copolymer resin according to the method of claim 5.

18. In a method of manufacturing an article with an ethylene-vinyl alcohol copolymer resin, the improvement comprising producing the ethylene-vinyl alcohol copolymer resin according to the method of claim 6.

19. In a method of manufacturing an article with an ethylene-vinyl alcohol copolymer resin, the improvement comprising producing the ethylene-vinyl alcohol copolymer resin according to the method of claim 7.

20. In a method of manufacturing an article with an ethylene-vinyl alcohol copolymer resin, the improvement comprising producing the ethylene-vinyl alcohol copolymer resin according to the method of claim 8.

21. In a method of manufacturing an article with an ethylene-vinyl alcohol copolymer resin, the improvement comprising producing the ethylene-vinyl alcohol copolymer resin according to the method of claim 9.

22. In a method of manufacturing an article with an ethylene-vinyl alcohol copolymer resin, the improvement comprising producing the ethylene-vinyl alcohol copolymer resin according to the method of claim 10.

23. In a method of manufacturing an article with an ethylene-vinyl alcohol copolymer resin, the improvement comprising producing the ethylene-vinyl alcohol copolymer resin according to the method of claim 12.

* * * * *